(12) United States Patent
Konegawa

(10) Patent No.: US 11,536,909 B2
(45) Date of Patent: Dec. 27, 2022

(54) OPTICAL WAVEGUIDE MEMBER CONNECTOR AND METHOD FOR PRODUCING THE SAME

(71) Applicant: NITTO DENKO CORPORATION, Osaka (JP)

(72) Inventor: Naoto Konegawa, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 17/262,416

(22) PCT Filed: Jul. 25, 2019

(86) PCT No.: PCT/JP2019/029209
§ 371 (c)(1),
(2) Date: Jan. 22, 2021

(87) PCT Pub. No.: WO2020/022428
PCT Pub. Date: Jan. 30, 2020

(65) Prior Publication Data
US 2021/0294043 A1 Sep. 23, 2021

(30) Foreign Application Priority Data
Jul. 25, 2018 (JP) .............................. JP2018-139649

(51) Int. Cl.
*G02B 6/36* (2006.01)
(52) U.S. Cl.
CPC ....................................... *G02B 6/36* (2013.01)
(58) Field of Classification Search
CPC .......... G02B 6/36; G02B 6/43; G02B 6/3861; G02B 6/122
See application file for complete search history.

(56) References Cited

U.S. PATENT DOCUMENTS 6,333,564 B1   12/2001  Katoh et al.
10,162,123 B2 * 12/2018  Smith .................. G02B 6/3831
(Continued)

FOREIGN PATENT DOCUMENTS

CN   102681106 A   9/2012
CN   103837932 A   6/2014
(Continued)

OTHER PUBLICATIONS

International Preliminary Report on Patentability issued by WIPO dated Jan. 26, 2021, in connection with International Patent Application No. PCT/JP2019/029209.
(Continued)

*Primary Examiner* — Jennifer Doan
(74) *Attorney, Agent, or Firm* — Edwards Neils LLC; Jean C. Edwards, Esq.

(57) ABSTRACT

An opto-electric hybrid board connector includes an opto-electric hybrid board, a connector, and an adhesive member. The board has a bottom surface, a first side surface, and a second side surface. The connector has an inner bottom surface, a first inner side surface, and a second inner side surface. The adhesive member includes a first adhesive member having contact with the inner bottom surface, first inner side surface, and first side surface facing a first gap, and a second adhesive member filled in the first gap and having contact with the inner bottom surface, second inner side surface, and second side surface facing a second gap. A ratio (L1/L0) of a width L1 of the first gap to a width L0 of the inner bottom surface, and a ratio (L2/L0) of a width L2 of the second gap to the width L0 of the inner bottom surface are 0.01 or more.

8 Claims, 4 Drawing Sheets

(56) References Cited

U.S. PATENT DOCUMENTS

| | | |
|---|---|---|
| 2008/0298748 A1 | 12/2008 | Cox et al. |
| 2010/0150501 A1 | 6/2010 | Cox et al. |
| 2012/0237158 A1 | 9/2012 | Inoue et al. |
| 2014/0147076 A1 | 5/2014 | Tsujita et al. |
| 2014/0147083 A1 | 5/2014 | Nakagawa et al. |
| 2016/0154188 A1 | 6/2016 | Nakagawa et al. |
| 2016/0377817 A1 | 12/2016 | Barwicz et al. |
| 2017/0285284 A1 | 10/2017 | Tsujita et al. |
| 2019/0113691 A1 | 4/2019 | Konegawa et al. |
| 2019/0219777 A1* | 7/2019 | Yakabe .................... H05K 1/00 |

FOREIGN PATENT DOCUMENTS

| | | |
|---|---|---|
| CN | 107076925 A | 8/2017 |
| JP | 2000-156435 A | 6/2000 |
| JP | 2013-228622 A | 11/2013 |
| JP | 2014-029445 A | 2/2014 |
| JP | 2014-106409 A | 6/2014 |
| JP | 2015-014925 A | 1/2015 |
| JP | 2016-139065 A | 8/2016 |
| JP | 2017-090838 A | 5/2017 |
| JP | 2017-191157 A | 10/2017 |
| JP | 2018-087843 A | 6/2018 |

OTHER PUBLICATIONS

International Search Report Issued in PCT/JP2019/029209 dated Sep. 3, 2019.

Written Opinion Issued in PCT/JP2019/029209 dated Sep. 3, 2019.

Notification of Reasons for Refusal issued by the Japanese Patent Office dated Apr. 19, 2022, in connection with Japanese Patent Application No. 2018-139649.

Office Action, issued by the State Intellectual Property Office dated Mar. 21, 2022, in connection with Chinese Patent Application No. 201980049476.5.

Notification of Reasons for Refusal issued by the Japanese Patent Office dated Sep. 13, 2022, in connection with Japanese Patent Application No. 2018-139649.

* cited by examiner

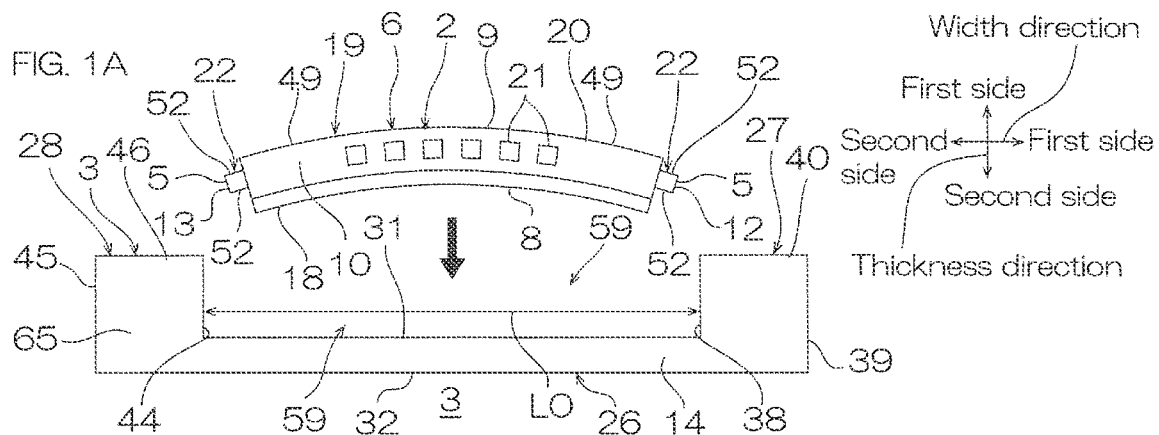
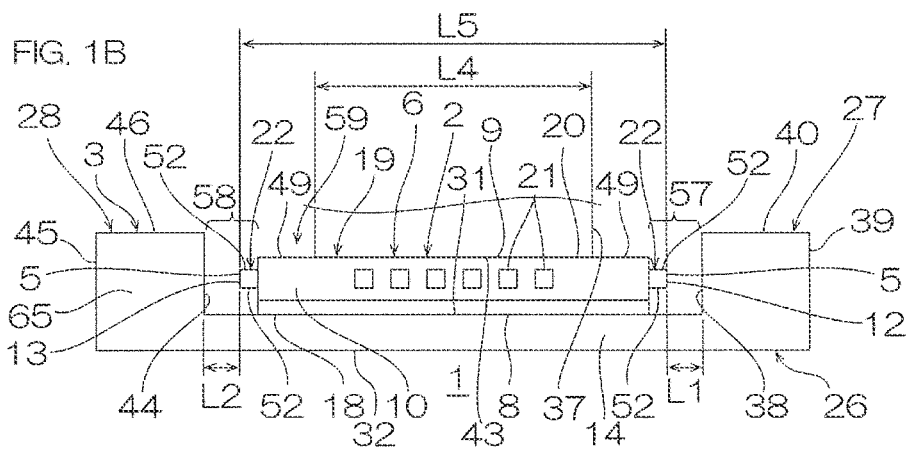
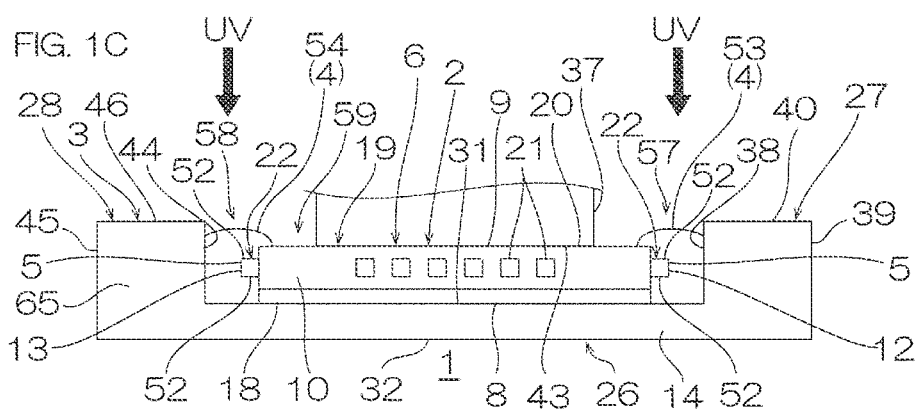
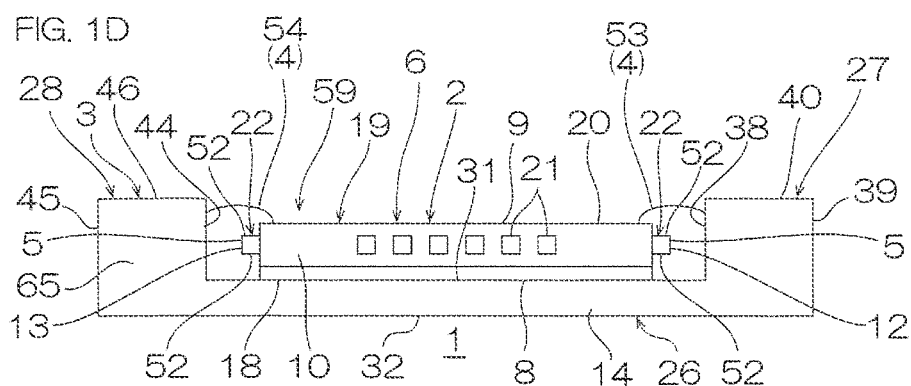

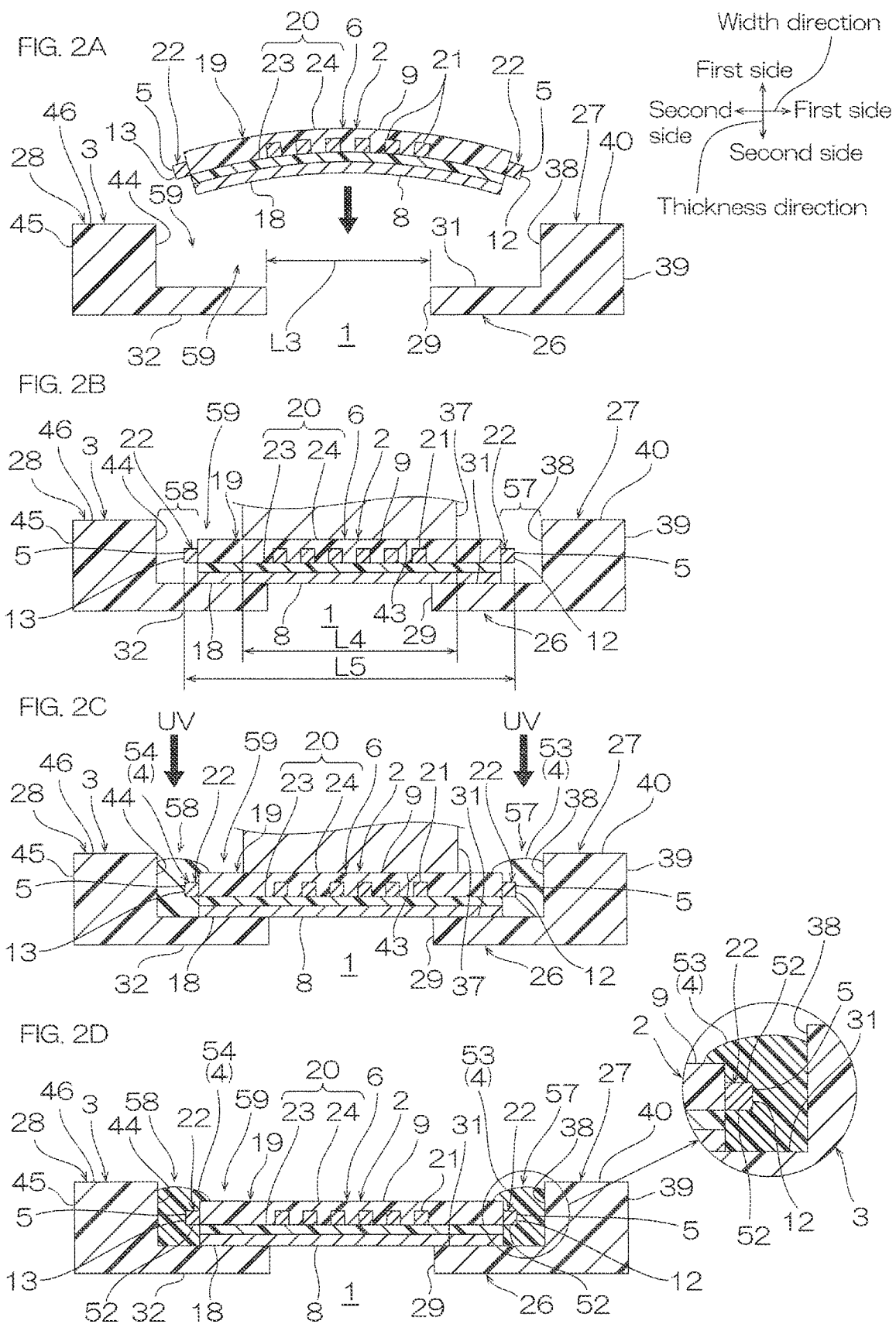

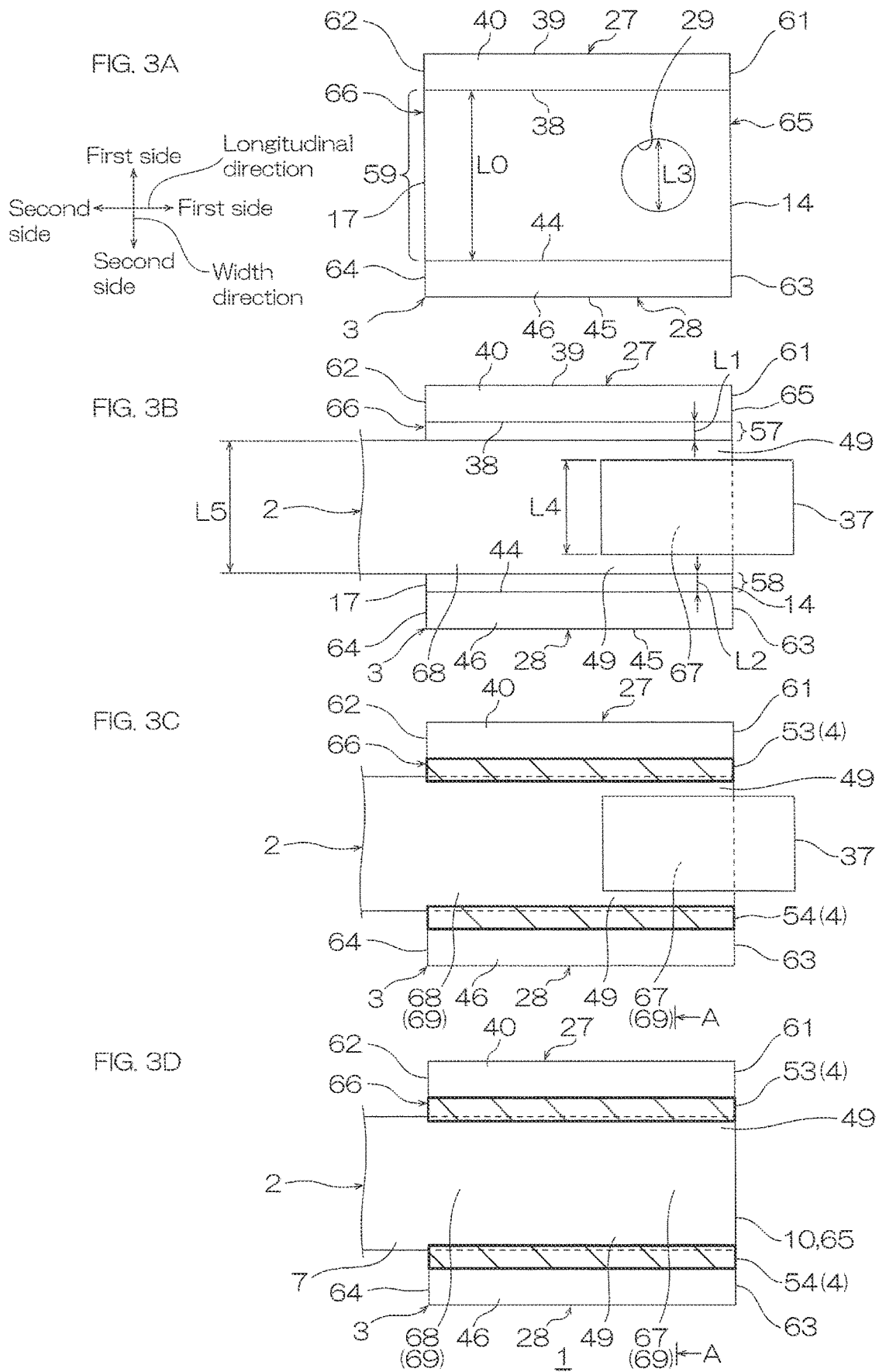

OPTICAL WAVEGUIDE MEMBER CONNECTOR AND METHOD FOR PRODUCING THE SAME

CROSS-REFERENCE TO RELATED APPLICATIONS

The present application is a 35 U.S.C. 371 National Stage Entry of PCT/JP2019/029209, filed on Jul. 25, 2019, which claims priority from Japanese Patent Application No. 2018-139649, filed on Jul. 25, 2018, the contents of all of which are herein incorporated by reference in their entirety.

TECHNICAL FIELD

The present invention relates to an optical waveguide member connector and a method for producing the same.

BACKGROUND ART

Conventionally, an optical connector kit including an optical waveguide and a connector member has been known (For example, Patent Document 1). In the optical connector kit described in Patent Document 1, the connector member includes a housing having a U shape in cross section and opening upwardly and a lid having a plat plate shape.

To produce the optical connector kit described in Patent Document 1, the ends of the optical waveguide is fitted into the housing of the connector member from above. Subsequently, to seal the upper end of the housing, a lid is disposed while pushing the optical waveguide from above.

CITATION LIST

Patent Document

Patent Document 1: Japanese Unexamined Patent Publication No. 2017-191157

SUMMARY OF THE INVENTION

Problem to be Solved by the Invention

Recently, in view of the reduction in components, the structure simplification, and the reduction in production steps, there is a need for an optical connector kit including a connector member without a lid.

In light of the foregoing, a structure in which the connector member does not include a lid in the optical connector kit described in Patent Document 1 is proposed.

However, the optical waveguide is very thin and flexible and thus tends to deform, for example, warp when being used singly. Thus, the above-proposed structure without a lid cannot sufficiently prevent the optical waveguide from wrapping even if the bottom surface of the housing has tight contact with the lower surface of the optical waveguide after the housing and the optical waveguide are attached. Specifically, the optical waveguide is not prevented from coming off away from the bottom surface of the housing.

Then, in the connector member, an end surface of the optical waveguide is not disposed at a desired position relative to the housing. As a result, there is a disadvantage that the optical connection reliability with another optical component decreases.

Meanwhile, to prevent the above-described coming off, an adhesive can be disposed between the bottom surface of the housing and the lower surface of the optical waveguide. In this case, however, the thickness of the adhesive causes the reduction in the positional precision of the end surface of the optical waveguide.

The present invention provides an optical waveguide member connector, which can reduce the components, simplify the structure, and simultaneously can prevent the deformation of the optical waveguide member and has excellent optical connection reliability, and a method with reduced steps for producing the optical waveguide member connector.

Means for Solving the Problem

The present invention (1) includes an optical waveguide member connector including: an optical waveguide member including an optical waveguide; a connector to which the optical waveguide member is attached, the connector having an approximately U shape in cross section; and an adhesive member making the optical waveguide member adhere to the connector, wherein the optical waveguide member has a bottom surface extending in a first direction orthogonal to a direction in which the optical waveguide extends and a thickness direction, and a first side surface and a second side surface that have shapes extending from both first-direction edges of the bottom surface to a thickness-direction first side, the connector has an inner bottom surface having contact with the bottom surface, a first inner side surface facing the first side surface across a first gap in the first direction, and a second inner side surface facing the second side surface across a second gap in the first direction, the first gap is filled with the adhesive member so that the adhesive member has contact with the inner bottom surface facing the first gap, the first inner side surface, and the first side surface, and the second gap is filled with the adhesive member so that the adhesive member has contact with the inner bottom surface facing the second gap, the second inner side surface, and the second side surface, and a ratio (L1/L0) of a first-direction length L1 of the first gap to a first-direction length L0 of the inner bottom surface, and a ratio (L2/L0) of a first-direction length L2 of the second gap to the first-direction length L0 of the inner bottom surface are 0.01 or more.

In the optical waveguide member connector, the adhesive member filling the first gap and the second gap makes the optical waveguide member adhere to the connector when the optical waveguide member is attached to the connector. Thus, even if the connector does not include a lid, the optical waveguide member can be attached thereto. As a result, this can reduce the components and simplify the structure.

Further, in the optical waveguide member connector, the ratio (L1/L0) of the first-direction length L1 of the first gap to the first-direction length L0 of the inner bottom surface, and the ratio (L2/L0) of the first-direction length L2 of the second gap to the first-direction length L0 of the inner bottom surface are large, i.e., 0.01 or more. Thus, the adhesive member in the first gap can make the inner bottom surface and first inner side surface of the connector firmly adhere to the first side surface of the optical waveguide member, and also the adhesive member in the second gap can make the inner bottom surface and second inner side surface in the connector firmly adhere to the second side surface of the optical waveguide member.

As a result, even if the connector does not include a lid, the bottom surface of the optical waveguide member can surely have contact with the inner bottom surface of the connector. This can prevent the optical waveguide member from coming off the inner bottom surface of the connector.

Accordingly, in the optical waveguide member connector, the optical waveguide end surface that inputs and outputs an optical signal in the optical waveguide member is disposed at a desired position relative to the connector. Thus, the optical waveguide member has excellent optical connection reliability with another optical component.

Furthermore, the inner bottom surface of the connector has contact with the bottom surface of the optical waveguide member. The contact prevents the reduction in the positional precision of the optical waveguide end surface relative to the connector. Meanwhile, even if the adhesive member is not between the inner bottom surface of the connector and the bottom surface of the optical waveguide member, the adhesive member filling the first gap and the second gap makes the optical waveguide member direct contact with the inner bottom surface of the connector.

The present invention (2) includes the optical waveguide member connector described (1), wherein the optical waveguide member further includes a top surface facing the bottom surface in the thickness direction and connecting the thickness-direction first edge of the first side surface to the thickness-direction first edge of the second side surface, and the adhesive member has continuous contact with a first-direction first end of the top surface and the first side surface, and has continuous contact with a first-direction second end of the top surface and the second side surface.

In the optical waveguide member connector, the adhesive member has continuous contact with the first-direction first end of the top surface and the first side surface, and also has continuous contact with the first-direction second end of the top surface and the second side surface. Thus, the adhesive member makes the connector more firmly adhere to the optical waveguide member.

The present invention (3) includes the optical waveguide member connector described in (2), wherein the connector has a first connector end surface on which an optical waveguide member end surface is disposed and the optical waveguide member end surface inputs and outputs an optical signal in the optical waveguide member, and the top surface located in proximity to the first connector end surface includes an exposed region exposed from the adhesive member toward the thickness-direction first side in an intermediate area between both the first-direction ends.

In the optical waveguide member connector, the top surface disposed in proximity to the first connector end surface has the exposed region exposed from the adhesive member toward the thickness-direction first side in the intermediate area between both the first-direction ends. This can push the pushing member to the exposed region. Then, the pushing member pushes the exposed region toward the thickness-direction second side. Then, the pushing member pushes the exposed region toward a thickness-direction second side. This push prevents the deformation of the optical waveguide member and simultaneously more surely makes the bottom surface of the optical waveguide member contact with the inner bottom surface of the connector.

The present invention (4) includes the optical waveguide member connector described in (3), wherein the connector further has a second connector end surface facing the first connector end surface in the direction in which the optical waveguide extends, and the top surface located in proximity to the second connector end surface includes a covered region covered with the adhesive member continuous to both the first-direction ends of the top surface.

In the optical waveguide member connector, the top surface disposed in proximity to the second connector end surface has a covered region covered with the adhesive member continuous to both the first-direction ends of the top surface in the intermediate area. Thus, the adhesive strength of the optical waveguide member to the connector increases.

The present invention (5) includes the optical waveguide member connector described in any one of (2) to (4), wherein the adhesive member continues in the direction in which the optical waveguide extends.

In the optical waveguide member connector, the adhesive member continues in the direction in which the optical waveguide extends. In the direction in which the optical waveguide extends, the adhesive strength of the optical waveguide member to the connector increases.

The present invention (6) includes the optical waveguide member connector described in any one of (1) to (5) including an alignment mark disposed at, at least, one of the first-direction ends.

In the optical waveguide member connector, the optical waveguide has the alignment mark and thus has excellent positional precision.

The present invention (7) includes the optical waveguide member connector described in (6), wherein the optical waveguide includes a core that is optically connected to another optical component, and a dummy core that is not optically connected to another optical component, and the alignment mark is the dummy core.

In the optical waveguide member connector, the alignment mark is not provided separately from the optical waveguide but the dummy core included in the optical waveguide is the alignment mark. This prevents the increase in components and gives excellent positional precision.

The present invention (8) includes the optical waveguide member connector described in any one of (1) to (7), wherein the connector includes a through hole facing the inner bottom surface and penetrating in the thickness direction.

In the optical waveguide member connector, when a suction device is connected to the through hole and is driven, the bottom surface of the optical waveguide member more surely has contact with the inner bottom surface of the connector.

The present invention (9) includes a method for producing an optical waveguide member connector including: a first step for preparing an optical waveguide member including an optical waveguide and having a bottom surface extending in a first direction orthogonal to a direction in which the optical waveguide extends and a thickness direction, and a first side surface and a second side surface that extend from both first-direction edges of the bottom surface to a thickness-direction first side, and a connector having an approximately U shape in cross section, the connector having an inner bottom surface, and a first inner side surface and a second inner side surface that extend in the thickness direction from both first-direction edges of the inner bottom surface; a second step for making the bottom surface contact with the inner bottom surface so that the first side surface faces the first inner side surface across a first gap in the first direction and the second side surface faces the second inner side surface across a second gap in the first direction; a third step for filling the first gap and the second gap with an ultraviolet curable adhesive; and a fourth step for applying ultraviolet light to the ultraviolet curable adhesive from the thickness-direction first side, wherein a ratio (L1/L0) of a first-direction length L1 of the first gap to a first-direction length L0 of the inner bottom surface, and a ratio (L2/L0) of a first-direction length L2 of the second gap to the first-direction length L0 of the inner bottom surface are 0.01 or more.

However, if the connector includes a lid and the lid is disposed with an adhesive to the optical waveguide member and the connector, the adhesive is covered with the connector and the lid from the outside. And thus, ultraviolet light cannot be applied to the adhesive, and thus an ultraviolet curable adhesive cannot be used. Then, a thermosetting adhesive requiring a long takt time has to be used.

However, in the producing method of the optical waveguide member connector, when the first gap and the second gap are filled with the ultraviolet curable adhesive, a lid is not disposed and the ultraviolet curable adhesive is exposed to the thickness-direction first side. Thus, ultraviolet light can be applied from the thickness-direction first side to the ultraviolet curable adhesive, and the ultraviolet curable adhesive can be cured in a short time. This can shorten the takt time. As a result, the production efficiency is improved.

Effects of the Invention

The optical waveguide member connector of the present invention has excellent optical connection reliability.

The method for producing the optical waveguide member connector of the present invention can improve its producing efficiency.

BRIEF DESCRIPTION OF THE DRAWINGS

FIGS. 1A to 1D are front elevation views of an opto-electric hybrid board connector and each step of a producing method of the opto-electric hybrid board connector as an embodiment of an optical waveguide member connector and a producing method of the optical waveguide member connector of the present invention. FIG. 1A illustrates a first step for preparing an opto-electric hybrid board and a connector. FIG. 1B illustrates a second step for bringing a bottom surface contact with an inner bottom surface. FIG. 1C illustrates a third step for filling a first gap and a second gap with an ultraviolet curable adhesive. FIG. 1D illustrates a fourth step for applying ultraviolet light to the ultraviolet curable adhesive.

FIGS. 2A to 2D are frontal cross sectional views corresponding to FIGS. 1A to 1D and taken along lines A-A of FIG. 3D. FIG. 2A illustrates the first step. FIG. 2B illustrates the second step. FIG. 2C illustrates the third step. FIG. 2D illustrates the fourth step.

FIGS. 3A to 3D are plan views corresponding to FIGS. 1A to 1D. FIG. 3A illustrates the first step. FIG. 3B illustrates the second step. FIG. 3C illustrates the third step. FIG. 3D illustrates the fourth step.

FIG. 4A is a plan view. FIG. 4B is a cross-sectional view taken along line B-B of FIG. 4A.

DESCRIPTION OF THE EMBODIMENTS

Figure 4A:
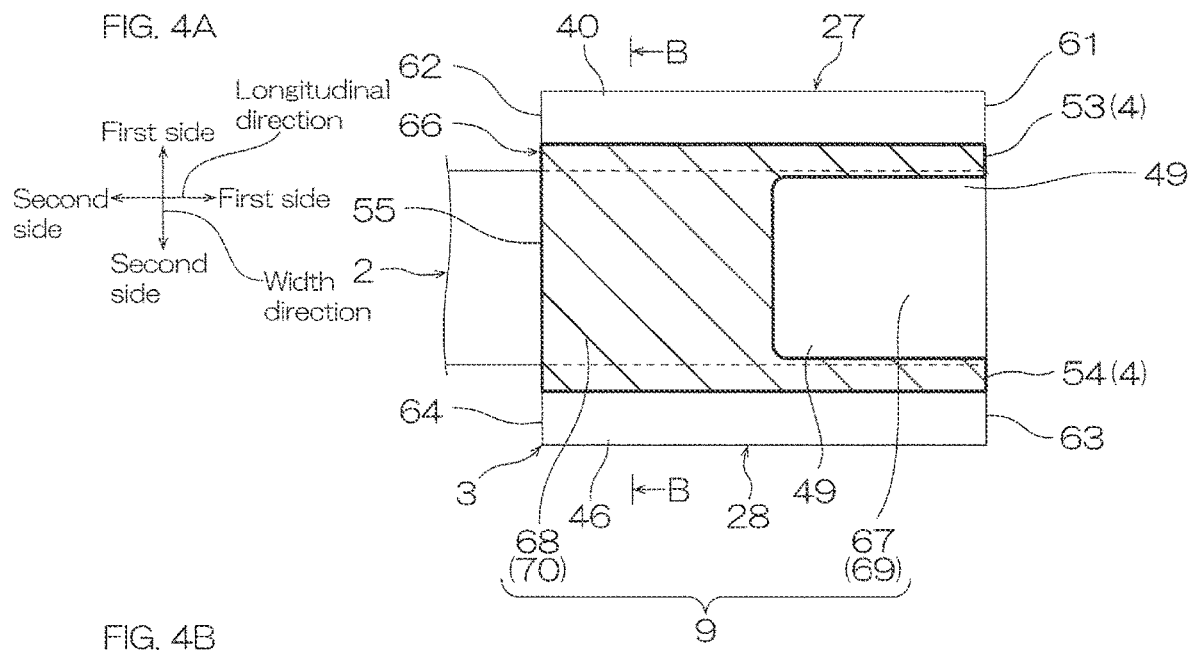
FIGS. 4A and 4B show a modified example of the embodiment illustrated in FIG. 3D.

An opto-electric hybrid board connector and a producing method of the opto-electric hybrid board connector as an embodiment of an optical waveguide member connector and a producing method of the optical waveguide member connector of the present invention will be described with reference to FIGS. 1A to 3D.

Note that, in FIGS. 1A to 1D, the boundary between an under clad 23 and an over clad 24 described below is not illustrated because the boundary is not actually visible. On the other hand, in FIGS. 2A to 2D, the boundary is illustrated so that the under clad 23 and the over clad 24 are clarified.

FIGS. 3C and 3D are plan views in which an adhesive member 4 is hatched with lines so that the adhesive member 4 is clearly illustrated.

As illustrated in FIGS. 1D, 2D, and 3D, an opto-electric hybrid board connector 1 includes an opto-electric hybrid board 2, a connector 3, and the adhesive member 4.

The opto-electric hybrid board 2 has a top surface 9 and a bottom surface 8 facing each other while leaving a space between them in a thickness direction. The opto-electric hybrid board 2 has a sheet (film) shape extending in a longitudinal direction (a direction orthogonal to the thickness direction) (an example of a direction in which an optical waveguide 19 described below extends). Each of the bottom surface 8 and the top surface 9 extends in the longitudinal direction and a width direction (a direction orthogonal to the thickness direction and the longitudinal direction) (an example of a first direction).

Further, the opto-electric hybrid board 2 has: a first side surface 12 that connects a width-direction first edge of the top surface 9 to a width-direction first edge of the bottom surface 8; and a second side surface 13 that that connects a width-direction second edge of the top surface 9 to a width-direction second edge of the bottom surface 8. In other words, the top surface 9 connects a thickness-direction first edge of the first side surface 12 to a thickness-direction first edge of the second side surface 13. Meanwhile, the bottom surface 8 connects a second thickness-direction edge of the first side surface 12 to a second thickness-direction edge of the second side surface 13.

Furthermore, the opto-electric hybrid board 2 also has: a first end surface 10 as an example of an optical waveguide member end surface that connects a longitudinal-direction first edge of the top surface 9 and a longitudinal-direction first edge of the bottom surface 8; and a second end surface (not illustrated) that connects a longitudinal-direction second edge of the top surface 9 and a longitudinal-direction second edge of the bottom surface 8. The first end surface 10 inputs and outputs an optical signal in the optical waveguide 19 described below.

The opto-electric hybrid board 2 integrally has the above-described top surface 9, the bottom surface 8, the first side surface 12, the second side surface 13, the first end surface 10, and the second end surface (not illustrated).

The opto-electric hybrid board 2 integrally has: an attached region 6 attached to the connector 3 at a longitudinal-direction first end; and an unattached region 7 continuous to a longitudinal-direction second end of the attached region 6. In the attached region 6, the top surface 9 has: two margin regions 49 located at width-direction first and second ends of the top surface 9; and first region 67 and second region 68 located at an intermediate area between the two margin regions 49. The first region 67 is located at a longitudinal-direction first side part of the top surface 9 in the attached region 6. The second region 68 is located at a longitudinal-direction second side part of the top surface 9 in the attached region 6.

The attached region 6 has the longitudinal-direction first end of the above-described top surface 9, the longitudinal-direction first end of the bottom surface 8, a longitudinal-direction first end of the first side surface 12, a longitudinal-direction first end of the second side surface 13, and the first end surface 10.

The opto-electric hybrid board 2 includes an electric circuit board 18 and the optical waveguide 19 in order in the thickness direction. In this embodiment, the opto-electric hybrid board 2 includes the electric circuit board 18 and the optical waveguide 19 toward a thickness-direction first side. Preferably, the opto-electric hybrid board 2 includes only the electric circuit board 18 and the optical waveguide 19.

The electric circuit board 18 has a sheet (film) shape extending in the longitudinal direction. A thickness-direction second surface of the electric circuit board 18 forms the bottom surface 8 of the opto-electric hybrid board 2. Note that, although not illustrated, the electric circuit board 18 includes, for example, a metal supporting board, a base insulting layer, a conductive layer, and a cover insulting layer toward a thickness-direction second side.

The optical waveguide 19 is disposed on a thickness-direction first surface of the electric circuit board 18. The optical waveguide 19 has a sheet (film) shape extending in the longitudinal direction. On a thickness-direction first surface of the optical waveguide 19, the top surface 9 of the opto-electric hybrid board 2 is formed.

The optical waveguide 19 includes a clad 20 and a core 21 covered with the clad 20. Specifically, the optical waveguide 19 is a strip optical waveguide and includes the under clad 23, the core 21, and the over clad 24. The optical waveguide 19 further includes a dummy core 22.

The under clad 23 is included in the clad 20. The under clad 23 has a layer shape extending in the longitudinal direction. The under clad 23 is disposed on the thickness-direction first surface of the electric circuit board 18.

The core 21 is a signal core that transmits light in the longitudinal direction. A plurality of the cores 21 are disposed at intervals in the width direction on a thickness-direction first surface of the under clad 23. The cores 21 extend in the longitudinal direction. Note that the cores 21 overlap the clad 20.

The over clad 24 is included in the clad 20. The over clad 24 has a layer shape extending in the longitudinal direction. Each of two side surfaces of the over clad 24, when being projected in the thickness direction, corresponds to each of two side surfaces of the under clad 23.

The dummy core 22 is not a core that inputs and outputs light to/from another optical component (not illustrated) to which the opto-electric hybrid board 2 is electrically connected, but an alignment mark to align the opto-electric hybrid board 2 with the connector 3. Thus, the dummy core 22 can emit, for example, an inspection light used for the above-described alignment.

The dummy cores 22 are disposed on both width-direction ends of the optical waveguide 19 (the opto-electric hybrid board 2). Each of the two dummy cores 22 is formed on each of two side surfaces of the over clad 24, protruding from each of the side surfaces outwardly in the width direction. Each of the dummy cores 22 has a cross sectional shape identical to that of each of the cores 21. Each of the dummy cores 22 has contact with the side surface of the over clad 24, and integrally includes: a contact surface extending in the thickness direction; two extending surfaces 52 extending from both thickness-direction edges of the contact surface outwardly in the width direction; and a dummy outer side surface 5 that connects width-direction outer edges of the two extending surfaces 52.

Further, both of the dummy cores 22, when being projected in the width direction, overlap the cores 21. Thickness-direction first and second surfaces of the dummy core 22, when being projected in the width direction, correspond to thickness-direction first and second surfaces of the cores 21, respectively.

Accordingly, each of two side surfaces of the optical waveguide 19 is formed integrally and continuously from each of two side surfaces of the under clad 23, an exposed surface exposed from the dummy core 22 on each of two side surfaces of the over clad 24, and the two extending surfaces 52 and dummy outer side surface 5 of each of the two dummy cores 22.

Examples of a material for the clad 20, the core 21, and the dummy core 22 include transparent resins such as epoxy resin, and acrylic resin. Among the clad 20, the core 21, and the dummy core 22, the refractive indexes of the core 21 and the dummy core 22 are higher than that of the clad 20. The refractive indexes of the core 21 and the dummy core 22 can be identical to or different from each other, and are preferably identical.

The clad 20 has a thickness, for example, of 20 μm or more, preferably 30 μm or more, and for example, 4000 μm or less, preferably 200 μm or less. The core 21 and the dummy core 22 have a thickness, for example, of 10 μm or more, preferably 30 μm or more, and for example, 2000 μm or less, preferably 70 μm or less. The core 21 and the dummy core 22 have a width, for example, of 10 μm or more, preferably 150 μm or more, and for example, 200 μm or less, preferably 100 μm or less.

The opto-electric hybrid board 2 has a thickness, for example, of 25 μm or more, preferably 40 μm or more, and for example, 5000 μm or less, preferably 250 μm or less.

A width-direction maximum length L5 of the attached region 6 of the opto-electric hybrid board 2 is, as described below, adjusted so that the width-direction length L0 of an inner bottom surface 31, a width-direction length L1 of a first gap 57, and a width-direction length L2 of a second gap 58, and the ratio of the lengths are in desired ranges.

The connector 3 does not include a lid and the attached region 6 of the opto-electric hybrid board 2 is fixedly attached thereto.

The connector 3, in a frontal view and a frontal cross-sectional view, has an approximately U shape opening toward the thickness-direction first side. The connector 3 supports the attached region 6 of the opto-electric hybrid board 2 from the thickness-direction second side and both width-direction outsides. As illustrated in FIGS. 1A, 2A, and 3A, specifically, the connector 3 integrally includes a bottom wall 26, a first side wall 27, and a second side wall 28.

The bottom wall 26 has an approximately rectangular flat plate shape extending in the longitudinal direction of the opto-electric hybrid board 2. The bottom wall 26 has the inner bottom surface 31 and a lower surface 32 facing each other while leaving a space between them in the thickness direction. The bottom wall 26 includes: a bottom-wall first end surface 14 that is a first end surface connecting a longitudinal-direction first edge of the inner bottom surface 31 to a longitudinal-direction first edge of the lower surface 32; and a bottom-wall second end surface 17 that is a second end surface connecting a longitudinal-direction second edge of the inner bottom surface 31 and a longitudinal-direction second edge of the lower surface 32.

As illustrated in FIGS. 1C and 2C, the inner bottom surface 31 has contact with the bottom surface 8 of the attached region 6 of the opto-electric hybrid board 2 and the adhesive member 4.

As illustrated in FIGS. 2A and 3A, the bottom wall 26 has a through hole 29 penetrating in the thickness direction. The through hole 29 reaches the inner bottom surface 31 and the lower surface 32. The through hole 29 is formed at a longitudinal-direction first side part and a width-direction intermediate area of the bottom wall 26. The through hole 29, in a planar view, has an approximately circular shape extending in the thickness direction of the bottom wall 26.

An inner diameter L3 of the through hole 29 is set shorter than the width of the bottom surface 8 of the opto-electric hybrid board 2.

The first side wall 27 has an approximately rectangular flat plate shape extending from a width-direction first end toward a thickness-direction first side of the bottom wall 26. As illustrated in FIGS. 2B and 3B, the first side wall 27 has: a first inner side surface 38 facing the above-described opto-electric hybrid board 2; a first outer side surface 39 disposed outside the first inner side surface 38 in the width direction, leaving a space from the first inner side surface 38; and a first connecting surface 40 connecting thickness-direction first ends of the first inner side surface 38 and first outer side surface 39. The first side wall 27 has: a first-side-wall first end surface 61 connecting longitudinal-direction first edges of the first inner side surface 38 and first outer side surface 39; and a first-side-wall second end surface 62 connecting longitudinal-direction second edges of the first inner side surface 38 and first outer side surface 39.

The first inner side surface 38 does not have contact with the opto-electric hybrid board 2 and faces the opto-electric hybrid board 2 across the first gap 57 (described below) in the width direction. The first inner side surface 38 makes a right angle with the inner bottom surface 31.

As illustrated in FIG. 3A, the first-side-wall first end surface 61 is flush with the bottom-wall first end surface 14.

The first-side-wall second end surface 62 is flush with the bottom-wall second end surface 17.

The second side wall 28 has an approximately rectangular flat plate shape extending from a width-direction second end toward the thickness-direction first side of the bottom wall 26. The second side wall 28 faces the first side wall 27 in the width direction across a space in which the opto-electric hybrid board 2 and the adhesive member 4 described next are provided. As illustrated in FIGS. 2B and 3B, the second side wall 28 has: a second inner side surface 44 facing the opto-electric hybrid board 2; a second outer side surface 45 disposed outside the second inner side surface 44 in the width direction while leaving a space therebetween; and a second connecting surface 46 connecting thickness-direction first ends of the second inner side surface 44 and second outer side surface 45. The second side wall 28 has: a second-side-wall first end surface 63 connecting longitudinal-direction first edges of the second inner side surface 44 and second outer side surface 45; and a second-side-wall second end surface 64 connecting longitudinal-direction second edges of the second inner side surface 44 and second outer side surface 45.

The second inner side surface 44 does not have contact with the opto-electric hybrid board 2, and faces the opto-electric hybrid board 2 across the second gap 58 (described below) in the width direction. The second inner side surface 44 makes a right angle with the inner bottom surface 31.

As illustrated in FIG. 3A, the second-side-wall first end surface 63 is flush with the bottom-wall first end surface 14.

The second-side-wall second end surface 64 is flush with the bottom-wall second end surface 17.

In the connector 3, the bottom-wall first end surface 14, the first-side-wall first end surface 61, and the second-side-wall first end surface 63 are flush with each other, forming a plane. Specifically, the bottom-wall first end surface 14, the first-side-wall first end surface 61, and the second-side-wall first end surface 63 form a first connector end surface 65. The first connector end surface 65 is disposed in proximity to the first end surface 10 (preferably, while being flush with the first end surface 10). Specifically, the first connector end surface 65, when being projected in the thickness direction, overlaps the first end surface 10.

Meanwhile, the bottom-wall second end surface 17, the first-side-wall second end surface 62, and the second-side-wall second end surface 64 are flush with each other, forming a plane. Specifically, they form a second connector end surface 66. The second connector end surface 66 faces the first connector end surface 65 at a longitudinal-direction second end.

The dimensions of the connector 3 are appropriately adjusted according to those of the opto-electric hybrid board 2. For example, the width-direction length L0 of the inner bottom surface 31 is adjusted so that the ratio of the width-direction length L0 to each of the width-direction length L1 of the first gap 57 and the width-direction length L2 of the second gap 58 described below is in a desired range. Specifically, the width-direction length L0 of the inner bottom surface 31 is, for example, 50 mm or less, or preferably 5 mm or less, and for example, 2 mm or more or preferably 3 mm or more.

In the connector 3, the opto-electric hybrid board 2 is accommodated. Specifically, in an accommodation space 59 compartmented by the inner bottom surface 31, first inner side surface 38, and second inner side surface 44, the attached region 6 of the opto-electric hybrid board 2 is accommodated. Specifically, the bottom surface 8 of the attached region 6 has contact with a width-direction intermediate area of the inner bottom surface 31.

Between the opto-electric hybrid board 2 and the first side wall 27, the first gap 57 dividing them is formed. Specifically, between the first side surface 12 and the first inner side surface 38, the first gap 57 is formed at a thickness-direction first side of a width-direction first end of the inner bottom surface 31.

The ratio (L1/L0) of the width-direction length L1 of the first gap 57 to the width-direction length L0 of the inner bottom surface 31 is 0.01 or more.

If the ratio (L1/L0) is less than 0.01, the next-described adhesive member 4 (a first adhesive member 53) to fill the first gap 57 cannot make the inner bottom surface 31 and first inner side surface 38 of the connector 3 firmly adhere to the first side surface 12 of the opto-electric hybrid board 2.

The width-direction length L1 of the first gap 57 is a minimum length between the first side surface 12 and the first inner side surface 38, or a distance between the nearest surface in the first side surface 12 to the first inner side surface 38 and the first inner side surface 38. In this embodiment, the width-direction length L1 of the first gap 57 is a length between the dummy outer side surface 5 of the dummy core 22 facing the first gap 57 and the first inner side surface 38.

The ratio (L1/L0) is preferably 0.013 or more, more preferably 0.015 or more, even more preferably 0.02 or more, and for example, 1.0 or less.

Meanwhile, between the opto-electric hybrid board 2 and the second side wall 28, the second gap 58 dividing them in the width direction is formed. Specifically, between the second side surface 13 and the second inner side surface 44, the second gap 58 is formed at a thickness-direction first side of a width-direction second end of the inner bottom surface 31.

The ratio (L2/L0) of the width-direction length L2 of the second gap 58 to the width-direction length L0 of the inner bottom surface 31 is 0.01 or more.

If the ratio (L2/L0) is less than 0.01, the adhesive member 4 (a second adhesive member 54) to fill the second gap 58 cannot make the inner bottom surface 31 and second inner side surface 44 of the connector 3 firmly adhere to the second side surface 13 of the opto-electric hybrid board 2.

The width-direction length L2 of the second gap 58 is a minimum length between the second side surface 13 and the second inner side surface 44, or a distance between the nearest surface in the second side surface 13 to the second inner side surface 44 and the second inner side surface 44. In this embodiment, the width-direction length L2 of the second gap 58 is a length between the dummy outer side surface 5 of the dummy core 22 facing the second gap 58 and the second inner side surface 44.

The ratio (L2/L0) is preferably 0.013 or more, more preferably 0.015 or more, even more preferably 0.02 or more, and for example, 1.0 or less.

In this embodiment, the two ratios, specifically, both of the ratio (L1/L0) and the ratio (L2/L0) are 0.01 or more. In other words, the ratio (L1/L0) is 0.01 or more and the ratio (L2/L0) is also 0.01 or more. The mode in which either of the two ratios is less than 0.01 is not included in the present invention. If either of the two ratios is less than 0.01, the bottom surface 8 of the opto-electric hybrid board 2 cannot surely have contact with the inner bottom surface 31 of the connector 3.

The ratio (L1/L0) can be identical to or different from the ratio (L2/L0). Preferably, the ratio (L1/L0) is identical to the ratio (L2/L0).

As illustrated in FIGS. 1D, 2D, and 3D, the adhesive member 4 makes the opto-electric hybrid board 2 adhere to the connector 3. The adhesive member 4 separately includes the first adhesive member 53 to fill the first gap 57 and the second adhesive member 54 to fill the second gap 58.

The first adhesive member 53 has contact with the inner bottom surface 31 facing the first gap 57, the first inner side surface 38, and the first side surface 12. Additionally, the first adhesive member 53 also has contact with the width-direction first end of the top surface 9. In other words, the first adhesive member 53 has continuous contact with the width-direction first end of the top surface 9 and first side surface 12 of the opto-electric hybrid board 2. In other words, the first adhesive member 53 covers the ridge line of the top surface 9 and first side surface 12.

Further, the first adhesive member 53, in a frontal view and a frontal cross-sectional view, has an approximate hook shape having a tip tapering toward a width-direction second end.

Furthermore, the first adhesive member 53 has a shape continuously extending in the longitudinal direction. Specifically, the first adhesive member 53 has contact with the whole surface of the inner bottom surface 31 facing the first gap 57 and extending in the longitudinal direction, the whole surface of a thickness-direction second side part and intermediate area of the first inner side surface 38 extending in the longitudinal direction, the whole surface of the first side surface 12 extending in the longitudinal direction in the attached region 6, and the whole surface of the width-direction first end of the top surface 9 extending in the longitudinal direction in the attached region 6.

The second adhesive member 54 has contact with the inner bottom surface 31 facing the second gap 58, the second inner side surface 44, and the second side surface 13. Additionally, the second adhesive member 54 also has contact with the width-direction second end of the top surface 9. In other words, the second adhesive member 54 has continuous contact with the width-direction second end of the top surface 9 and second side surface 13 of the opto-electric hybrid board 2. In other words, the second adhesive member 54 covers the ridge line of the top surface 9 and second side surface 13.

Furthermore, the second adhesive member 54, in a frontal view and a frontal cross-sectional view, has an approximate hook shape having a tip tapering toward the width-direction second end.

Furthermore, the second adhesive member 54 has a shape continuously extending in the longitudinal direction. Specifically, the second adhesive member 54 has contact with the whole surface of the inner bottom surface 31 facing the second gap 58 and extending in the longitudinal direction, the whole surface of the thickness-direction second side part and intermediate area of the second inner side surface 44 extending in the longitudinal direction, the whole surface of the second side surface 13 extending in the longitudinal direction in the attached region 6, and the whole surface of the width-direction second end of the top surface 9 extending in the longitudinal direction in the attached region 6.

The second adhesive member 54 is not continuous to but independent from the first adhesive member 53, and is disposed on a width-direction second side of the first adhesive member 53 while leaving a space therebetween.

In this manner, the first adhesive member 53 and the second adhesive member 54 leave the first region 67 and second region 68 of the top surface 9 exposed to the thickness-direction first side. In this embodiment, both of the first region 67 and second region 68 are an exposed region 69.

Note that the adhesive member 4 does not exist between the bottom surface 8 and the inner bottom surface 31.

Examples of the adhesive member 4 include a cured product of a curable adhesive and a plastic product of a thermoplastic adhesive (including a hot-melt adhesive). Preferably, for obtaining high adhesive strength, a cured product of a curable adhesive is used, and more preferably, for reducing the takt time, a cure product of an ultraviolet curable adhesive is used.

Next, the producing method of the opto-electric hybrid board connector 1 will be described.

The producing method of the opto-electric hybrid board connector 1 includes: a first step for preparing the opto-electric hybrid board 2 and the connector 3 (see FIGS. 1A and 2A), a second step for making the bottom surface 8 contact with the inner bottom surface 31 (see FIGS. 1B and 2B), a third step for filling the first gap 57 and the second gap 58 with the ultraviolet curable adhesive (see FIGS. 1C, 2C, and 3C), and a fourth step for applying ultraviolet light to the ultraviolet curable adhesive (see FIGS. 1D, 2D, and 3D).

As illustrated in FIGS. 1A and 2A, in the first step, each of the opto-electric hybrid board 2 and the connector 3 is prepared.

In the first step, to prepare the opto-electric hybrid board 2, the electric circuit board 18 is first prepared. Subsequently, the optical waveguide 19 is assembled on a thickness-direction first side of the electric circuit board 18. Specifically, on the thickness-direction first surface of the electric circuit board 18, the under clad 23 is formed with a width wider than a designed width. Next, on a thickness-direction first surface of the under clad 23, the core 21 and the dummy core 22 are simultaneously formed. Subsequently, on the thickness-direction first surface of the under clad 23, the over clad 24 is formed so as to cover the core 21 without covering the dummy core 22. After that, both width-direction ends of the under clad 23 are removed so as to make a thickness-direction second surface of the dummy core 22 exposed. In this manner, the opto-electric hybrid board 2 is produced.

Meanwhile, the connector 3 having the above-described shape is formed by a molding method, for example, extrusion molding.

Note that, before being attached to the connector 3, the opto-electric hybrid board 2 has flexibility and a shape (property) to be curved in a cross-sectional view and an elevational view. Specifically, as illustrated in FIGS. 1A and 2A, the width-direction central area is curved while coming off toward the thickness-direction first side.

As illustrated in FIGS. 1B, 2B, and 3B, next in the second step, the bottom surface 8 is made contact with the inner bottom surface 31. Specifically, the opto-electric hybrid board 2 is attached to the bottom wall 26 so that the first gap 57 where the first side surface 12 faces the first inner side surface 38 is compartmented by the above-described width-direction length L1 and the second gap 58 where the second side surface 13 faces the second inner side surface 44 is also compartmented by the above-described width-direction length L2. Specifically, the opto-electric hybrid board 2 is disposed on the width-direction central area of the inner bottom surface 31.

At that moment, for example, a pushing member 37 pushes the first region 67 of the top surface 9 toward the thickness-direction second side.

The pushing member 37 has a flat pushing surface 43 on its thickness-direction second surface. Note that, a width-direction length L4 of the pushing surface 43 is adjusted in advance so that the pushing surface 43 overlaps the longitudinal-direction first ends of all the cores 21 when the pushing member 37 pushes the first region 67. Meanwhile, the width-direction length L4 of the pushing surface 43 is adjusted so that the pushing surface 43 does not have contact with the margin region 49 of the top surface 9.

In addition to the pushing of the pushing member 37, a suction device (not illustrated) is connected to the through hole 29 and is driven so as to make the bottom surface 8 directly contact with the inner bottom surface 31 by bringing the through hole 29 into negative pressure.

The above-described pushing of the pushing member 37 and driving of the suction device make the bottom surface 8 directly contact with the inner bottom surface 31, and thus make the shape of the opto-electric hybrid board 2 flat in the width direction.

Note that the through hole 29 is sealed by the bottom surface 8.

In the second step, the first gap 57 and the second gap 58 are compartmented.

At the same time, in the second step, the alignment of the opto-electric hybrid board 2 with the connector 3 is carried out. For example, light is input from a longitudinal-direction second end surface and exits from a first end surface of the dummy core 22. The exit light is detected by, for example, a camera (not illustrated) facing the first end surface 10 to carry out the alignment of the opto-electric hybrid board 2 with the connector 3.

As illustrated in FIGS. 1C, 2C, and 3C, next in the third step, the first gap 57 and the second gap 58 are filled with the ultraviolet curable adhesive.

The type of the ultraviolet curable adhesive is not particularly limited, and appropriately selected from, for example, an acrylic adhesive, an epoxy adhesive, and a silicone adhesive. The characteristics of the ultraviolet curable adhesive are not particularly limited, and can be in any of liquid, semisolid, and solid states.

The ultraviolet curable adhesive is disposed from thickness-direction first sides of the first gap 57 and second gap 58.

In this manner, in the first gap 57, the ultraviolet curable adhesive has contact with the inner bottom surface 31 facing the first gap 57, the first inner side surface 38, the first side surface 12, and the width-direction first end of the top surface 9.

Similarly, in the second gap 58, the ultraviolet curable adhesive has contact with the inner bottom surface 31 facing the second gap 58, the second inner side surface 44, the second side surface 13, and the width-direction second end of the top surface 9.

In the third step, the pushing of the pushing member 37 and the driving of the suction device are continued.

As shown with the arrows in FIGS. 1C and 2C, subsequently in fourth step, ultraviolet light is applied to the ultraviolet curable adhesive. Specifically, ultraviolet light is applied to the ultraviolet curable adhesive from a thickness-direction first side of the ultraviolet curable adhesive. The application time of the ultraviolet light is appropriately set according to its irradiation energy, and for example, 100 seconds or less, preferably 20 seconds or less, and for example, 1 second or more.

The application of the ultraviolet light cures the ultraviolet curable adhesive and forms the adhesive member 4 from the cured product of the ultraviolet curable adhesive.

Specifically, the first side surface 12 and the width-direction first end of the top surface 9 of the opto-electric hybrid board 2 are fixed through the first adhesive member 53 to the inner bottom surface 31 facing the first gap 57 and the first inner side surface 38. Similarly, the second side surface 13 and the width-direction second end of the top surface 9 of the opto-electric hybrid board 2 are fixed through the second adhesive member 54 to the inner bottom surface 31 facing the second gap 58 and the second inner side surface 44.

In this manner, the opto-electric hybrid board 2 is attached to the connector 3.

After that, the driving of the suction device is stopped and the pushing member 37 is removed from the top surface 9.

At the moment, even if a force that separates the bottom surface 8 from the inner bottom surface 31 (elastic force or resilient force) acts on the bottom surface 8 of the opto-electric hybrid board 2, the first side surface 12 and both the width-direction ends of the top surface 9 of the opto-electric hybrid board 2 are firmly fixed to the connector 3 with the adhesive member 4, and thus tension, which keeps the bottom surface 8 flat and in contact with the inner bottom surface 31, acts. Thus, even during the driving of the suction device stops and the pushing member 37 is removed, the bottom surface 8 continues to have (direct) contact with the inner bottom surface 31.

In this manner, the opto-electric hybrid board connector 1 is produced.

Further, in the opto-electric hybrid board connector 1, the opto-electric hybrid board 2 adheres to the connector 3 with the adhesive member 4 filling the first gap 57 and the second gap 58. Thus, the opto-electric hybrid board 2 can be attached to the connector 3 without the lid described in Patent Document 1. As a result, the components can be reduced and the structure can be simplified.

Furthermore, in the opto-electric hybrid board connector 1, the ratio (L1/L0) of the width direction length L1 of the first gap 57 to the width direction length L0 of the inner bottom surface 31, and the ratio (L2/L0) of the width direction length L2 of the second gap 58 to the width direction length L0 of the inner bottom surface 31 are large, i.e, 0.01 or more. This enables the first adhesive member 53 in the first gap 57 to make the inner bottom surface 31 facing the first gap 57 and the first inner side surface 38 of the connector 3 firmly adhere to the first side surface 12 of the opto-electric hybrid board 2, and also enables the second adhesive member 54 in the second gap 58 to make the inner bottom surface 31 facing the second gap 58 and the second inner side surface 44 of the connector 3 firmly adhere to the second side surface 13 of the opto-electric hybrid board 2.

As a result, even if the connector 3 does not have a lid, the bottom surface 8 of the opto-electric hybrid board 2 can surely have contact with the inner bottom surface 31 of the connector 3. This prevents the opto-electric hybrid board 2 from coming off the inner bottom surface 31 of the connector 3.

Accordingly, in the opto-electric hybrid board connector 1, the first end surface 10 that inputs and outputs an optical signal in the opto-electric hybrid board 2 is disposed at a desired position relative to the connector 3. Thus, the opto-electric hybrid board 2 has excellent optical connection reliability with another optical component.

Further, the inner bottom surface 31 of the connector 3 has contact with the bottom surface 8 of the opto-electric hybrid board 2. In other words, the adhesive member 4 having a thickness does not exist between the inner bottom surface 31 and the bottom surface 8. This prevents the existence of adhesive member 4 from causing the reduction in the positional precision of the first end surface 10 relative to the connector 3. Meanwhile, even without the adhesive member 4 between the inner bottom surface 31 of the connector 3 and the bottom surface 8 of the opto-electric hybrid board 2, the adhesive member 4 filling the first gap 57 and the second gap 58 can surely make the opto-electric hybrid board 2 contact with the inner bottom surface 31 of the connector 3.

Furthermore, in the opto-electric hybrid board connector 1, the first adhesive member 53 has continuous contact with the width-direction first end of the top surface 9 and the first side surface 12, and the second adhesive member 54 has continuous contact with the width-direction second end of the top surface 9 and the second side surface 13. This enables the adhesive member 4 including the first adhesive member 53 and second adhesive member 54 to make the connector 3 more firmly adhere to the opto-electric hybrid board 2.

Furthermore, in the opto-electric hybrid board connector 1, the top surface 9 located in proximity to the first end surface 10 has the exposed region 69 (the first region 67). This enables the pushing member 37 to push the exposed region 69. Then, the pushing member 37 pushes the exposed region 69 toward the thickness-direction second side. This push prevents the opto-electric hybrid board 2 from coming off and simultaneously more surely makes the bottom surface 8 of the opto-electric hybrid board 2 contact with the inner bottom surface 31 of the connector 3.

Furthermore, in the opto-electric hybrid board connector 1, the adhesive member 4 (each of the first adhesive member 53 and the second adhesive member 54) continues in the longitudinal direction. This increases the adhesive strength of the opto-electric hybrid board 2 to the connector 3 in the longitudinal direction.

Furthermore, in the opto-electric hybrid board connector 1, the opto-electric hybrid board 2 includes the dummy core 22 as an alignment mark and thus has excellent positional precision.

Furthermore, in the opto-electric hybrid board connector 1, the alignment mark is not provided separately from the opto-electric hybrid board 2 (more specifically, the alignment mark is not formed in a different step from a step in which the core 21 is formed). But the alignment mark is the dummy core 22 included in the opto-electric hybrid board 2 and formed together with the core 21. This prevents the increase in components and gives excellent positional precision.

Furthermore, the suction device is connected to the through hole 29 and is driven. This enables the bottom surface 8 of the opto-electric hybrid board 2 to surely have contact with the inner bottom surface 31 of the connector 3.

Furthermore, in the producing method of the opto-electric hybrid board connector 1, the opto-electric hybrid board 2 is attached while the connector 3 does not include a lid. This reduces the production steps.

However, if the connector 3 includes a lid and the lid is disposed with an adhesive to the opto-electric hybrid board connector 1 and the connector 3, the adhesive is covered with the connector and the lid from the outside. And thus, ultraviolet light cannot be applied to the adhesive and the ultraviolet curable adhesive cannot be used. As a result, a thermosetting adhesive has to be used.

However, in the producing method of the opto-electric hybrid board connector 1 in this embodiment, when the first gap 57 and the second gap 58 are filled with the ultraviolet curable adhesive, a lid is not disposed and the ultraviolet curable adhesive is exposed to the thickness-direction first side. Thus, ultraviolet light can be applied from the thickness-direction first side to the ultraviolet curable adhesive, and the ultraviolet curable adhesive can be cured in a short time. This can shorten the takt time. As a result, the production efficiency is improved.

MODIFIED EXAMPLE

Next, modified examples of the embodiment will be described. In each of the following modified examples, the same reference numerals are provided for members and steps corresponding to each of those in the above-described embodiment, and their detailed description is omitted. Each of the modified examples can be appropriately used in combination. Furthermore, in each of the modified examples, the same function and effect as that of the embodiment can be achieved unless otherwise specified.

In the embodiment, the opto-electric hybrid board 2 includes the electric circuit board 18 and the optical waveguide 19 in order toward the thickness-direction first side. For example, however, the opto-electric hybrid board 2 can include them also in order toward the thickness-direction second side, although not being illustrated.

In the embodiment, the dummy core 22 is formed as the same layer as the core 21. However, the dummy core 22 can be formed as a different layer from the core 21. Alternatively, the dummy core 22 can be disposed on the thickness-direction first surface of the under clad 23 while being covered with the over clad 24. Note that the opto-electric hybrid board 2 includes the dummy core 22. For example, however, the opto-electric hybrid board 2 can have a structure without the dummy core 22, although not being illustrated.

In the embodiment, the dummy cores 22 are disposed at both the width-direction ends of the opto-electric hybrid board 2. The dummy cores 22, however, can be disposed at only one of the width-direction ends.

In the embodiment, the opto-electric hybrid board 2 is shown as an example of the optical waveguide member. For example, although not being illustrated, an example of the optical waveguide member does not include the electric circuit board 18 but includes the optical waveguide 19. Preferably, an example of the optical waveguide member is the optical waveguide 19. In such a case, an example of the optical waveguide member connector is an optical waveguide connector As illustrated in FIGS. 4A and 4B, the adhesive member 4 can include a third adhesive member 55 disposed in the second region 68 integrally with the first adhesive member 53 and the second adhesive member 54.

The third adhesive member 55 is continuous to the first adhesive member 53 and second adhesive member 54 disposed at both width-direction sides of the second region 68. The third adhesive member 55 covers the second region 68 of the top surface 9. Thus, the second region 68 is a covered region 70 covered with the third adhesive member 55 in the top surface 9. Meanwhile, in the top surface 9 of the modified example illustrated in FIGS. 4A and 4B, only the first region 67 is the exposed region 69.

Figure 4B:
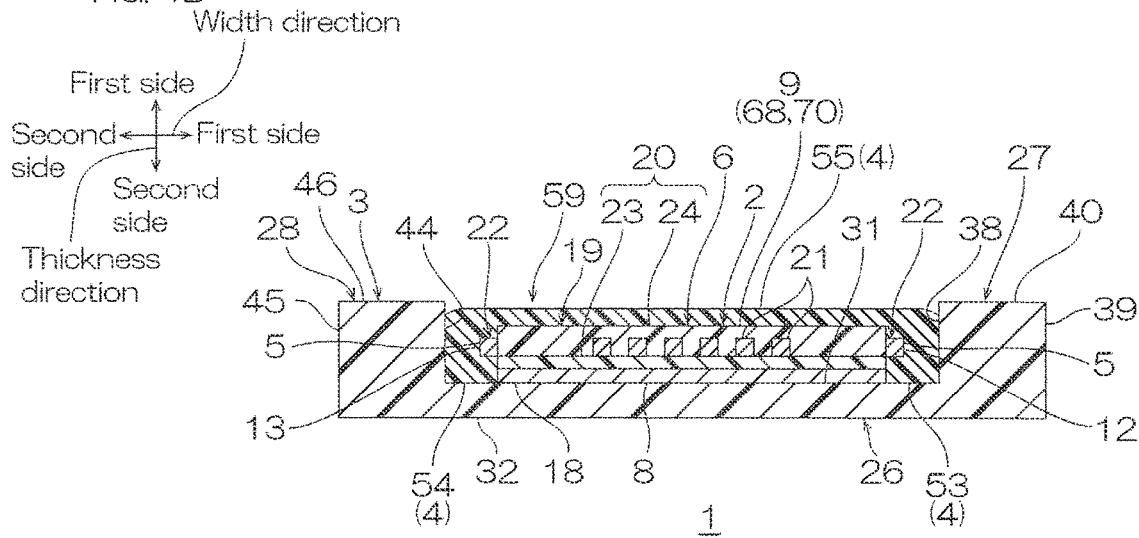

In the opto-electric hybrid board connector 1 illustrated in FIGS. 4A and 4B, the top surface 9 has the covered region 70 covered with the third adhesive member 55. This increases the adhesive strength of the opto-electric hybrid board 2 to the connector 3.

Figure 5:
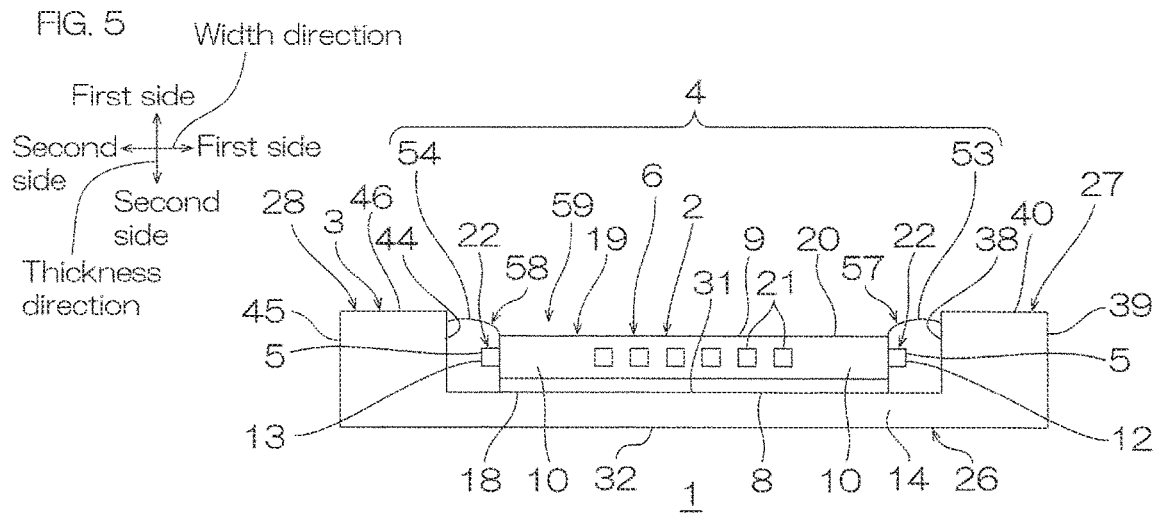
FIG. 5 is a front elevation view of a modified example of the embodiment illustrated in FIG. 1D.

As illustrated in FIG. 5, the adhesive member 4 can leave both width-direction ends of the top surface 9 exposed. Specifically, the first adhesive member 53 does not have contact with the width-direction first end of the top surface 9 but has contact only with the first side surface 12 of the opto-electric hybrid board 2 in the first gap 57. The second adhesive member 54 does not have contact with the width-direction second end of the top surface 9 but has contact only with the second side surface 13 of the opto-electric hybrid board 2 in the second gap 58.

EXAMPLES

With reference to examples and comparative examples below, the present invention will be described in more detail. Note that the present invention is not limited any of the examples and comparative examples. The specific numeral values used in the description below, such as mixing ratios (contents), physical property values, and parameters can be redisposed with corresponding mixing ratios (contents), physical property values, parameters in the above-described "DESCRIPTION OF EMBODIMENTS", including the upper limit value (numeral values defined with "or less", and "less than") or the lower limit value (numeral values defined with "or more", and "more than").

Example 1

As illustrated in FIGS. 1A and 2A, the opto-electric hybrid board 2 having the attached region 6 with the maximum length L5 (FIGS. 1B and 2B) of 3 mm and the connector 3 having the inner bottom surface 31 with the width-direction length L0 of 5 mm were prepared (the first step).

As illustrated in FIGS. 1B and 2B, to form the first gap 57 and the second gap 58, subsequently, the bottom surface 8 was made contact with the inner bottom surface 31 (the second step). The first gap 57 had the width L1 of 1.00 mm, and the second gap 58 had the width L2 of 1.00 mm. Then, the ratio (L1/L0) and the ratio (L2/L0) were 0.200.

As illustrated in FIGS. 1C and 2C, the first gap 57 and the second gap 58 were filled with an ultraviolet curable acrylic adhesive (the third step).

As shown with the arrows in FIGS. 1C and 2C, ultraviolet light was applied to the ultraviolet cure acrylic adhesive from the thickness-direction first side, and a cured product was formed. In this manner, in FIGS. 1D and 2C, the adhesive member 4 including the first adhesive member 53 and the second adhesive member 54 was formed. In this manner, the opto-electric hybrid board connector 1 was produced.

In the opto-electric hybrid board connector 1, the bottom surface 8 had contact with the inner bottom surface 31, and the opto-electric hybrid board 2 was flat.

The dimensions of the opto-electric hybrid board connector 1 will be transcribed in Table 1.

Example 1 to Comparative Example 2

Except that the dimensions were changed as shown in Table 1, opto-electric hybrid board connectors 1 were produced in the same manner as Example 1.

In the opto-electric hybrid board connectors 1 of Comparative Examples 1 and 2, a bottom surface 8 came off from an inner bottom surface 31.

TABLE 1

|  | Example 1 | Example 2 | Comparative Example 1 | Comparative Example 2 |
| --- | --- | --- | --- | --- |
| Inner bottom surface width L0 | 5 | 3.07 | 3.01 | 3.03 |
| First gap width L1 | 1 | 0.035 | 0.005 | 0.015 |
| Second gap width L2 | 1 | 0.035 | 0.005 | 0.015 |
| L1/L0 | 0.200 | 0.011 | 0.002 | 0.005 |
| L2/L0 | 0.200 | 0.011 | 0.002 | 0.005 |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The optical waveguide member connector of the present invention is used, for example, for an opto-electric hybrid board connector.

1 opto-electric hybrid board connector
2 opto-electric hybrid board
3 connector
4 adhesive member
8 bottom surface
10 first end surface
12 first side surface
13 second side surface
21 core
22 dummy core
29 through hole
31 inner bottom surface
38 first inner side surface
44 second inner side surface
57 first gap
58 second gap
69 exposed region
70 covered region

The invention claimed is:
1. An optical waveguide member connector comprising:

an optical waveguide member including an optical waveguide;

a connector to which the optical waveguide member is attached, the connector having an approximately U shape in cross section; and an adhesive member making the optical waveguide member adhere to the connector, wherein the optical waveguide member includes:
- a bottom surface extending in a first direction orthogonal to a direction in which the optical waveguide extends and a thickness direction, and
- a first side surface and a second side surface that have shapes extending from both first-direction edges of the bottom surface to a thickness-direction first side, wherein the connector includes:
- an inner bottom surface having contact with the bottom surface,
- a first inner side surface facing the first side surface across a first gap in the first direction, and
- a second inner side surface facing the second side surface across a second gap in the first direction, wherein the first gap is filled with the adhesive member so that the adhesive member has contact with the inner bottom surface facing the first gap, the first inner side surface, and the first side surface, and the second gap is filled with the adhesive member so that the adhesive member has contact with the inner bottom surface facing the second gap, the second inner side surface, and the second side surface, wherein a ratio (L1/L0) of a first-direction length L1 of the first gap to a first-direction length L0 of the inner bottom surface, and a ratio (L2/L0) of a first-direction length L2 of the second gap to the first-direction length L0 of the inner bottom surface are 0.01 or more, wherein the connector does not include a lid, wherein the optical waveguide member further includes:
- a top surface facing the bottom surface in the thickness direction and connecting the thickness-direction first edge of the first side surface to the thickness-direction first edge of the second side surface, and wherein the adhesive member has continuous contact with a first-direction first end of the top surface and the first side surface, and has continuous contact with a first-direction second end of the top surface and the second side surface.

2. The optical waveguide member connector according to claim 1, wherein the connector has a first connector end surface on which an optical waveguide member end surface is disposed and the optical waveguide member end surface inputs and outputs an optical signal in the optical waveguide member, and wherein the top surface located in proximity to the first connector end surface includes an exposed region exposed from the adhesive member toward the thickness-direction first side in an intermediate area between both the first-direction ends.

3. The optical waveguide member connector according to claim 2, wherein the connector further has a second connector end surface facing the first connector end surface in the direction in which the optical waveguide extends, and wherein the top surface located in proximity to the second connector end surface includes a covered region covered with the adhesive member continuous to both the first-direction ends of the top surface.

4. The optical waveguide member connector according to claim 1, wherein the adhesive member continues in the direction in which the optical waveguide extends.

5. The optical waveguide member connector according to claim 1, further comprising an alignment mark disposed at, at least, one of the first-direction ends.

6. The optical waveguide member connector according to claim 5, wherein the optical waveguide includes:
- a core that is optically connected to another optical component, and
- a dummy core that is not optically connected to another optical component, and wherein the alignment mark is the dummy core.

7. The optical waveguide member connector according to claim 1, wherein the connector includes:
- a through hole facing the inner bottom surface and penetrating in the thickness direction.

8. A method for producing an optical waveguide member connector comprising:

a first step of preparing:
- an optical waveguide member including an optical waveguide and having a bottom surface extending in a first direction orthogonal to a direction in which the optical waveguide extends and a thickness direction, a first side surface and a second side surface that extend from both first-direction edges of the bottom surface to a thickness-direction first side, and a top surface connecting a thickness-direction first edge of the first side surface to a thickness-direction first edge of the second side surface, and
- a connector not including a lid, the connector having an approximately U shape in cross section, the connector having an inner bottom surface, and a first inner side surface and a second inner side surface that extend in the thickness direction from both first-direction edges of the inner bottom surface;

a second step of making the bottom surface contact with the inner bottom surface so that the first side surface faces the first inner side surface across a first gap in the first direction and the second side surface faces the second inner side surface across a second gap in the first direction;

a third step of filling the first gap and the second gap with an ultraviolet curable adhesive; and a fourth step of applying ultraviolet light to the ultraviolet curable adhesive from the thickness-direction first side, wherein a ratio (L1/L0) of a first-direction length L1 of the first gap to a first-direction length L0 of the inner bottom surface, and a ratio (L2/L0) of a first-direction length L2 of the second gap to the first-direction length L0 of the inner bottom surface are 0.01 or more, and wherein, in the third step, the ultraviolet curable adhesive filling the first gap has contact with a first-direction first end of the top surface, and the ultraviolet curable adhesive filling the second gap has contact with a first-direction second end of the top surface.

* * * * *